United States Patent
Yang et al.

(10) Patent No.: US 11,164,230 B2
(45) Date of Patent: Nov. 2, 2021

(54) SERVICE EXECUTION METHOD, APPARATUS, AND DEVICE FOR USE IN CLIENT TERMINAL AND SERVER

(71) Applicant: ADVANCED NEW TECHNOLOGIES CO., LTD., Grand Cayman (KY)

(72) Inventors: Fan Yang, Hangzhou (CN); Huanmi Yin, Hangzhou (CN); Xiaodong Zeng, Hangzhou (CN); Feng Lin, Hangzhou (CN); Sihai Yao, Hangzhou (CN); Hong Zhang, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 78 days.

(21) Appl. No.: 16/675,399

(22) Filed: Nov. 6, 2019

(65) Prior Publication Data
US 2020/0074443 A1 Mar. 5, 2020

Related U.S. Application Data

(63) Continuation of application No. PCT/CN2018/103732, filed on Sep. 3, 2018.

(30) Foreign Application Priority Data

Sep. 8, 2017 (CN) .......................... 201710805490.6

(51) Int. Cl.
*G06Q 30/06* (2012.01)
*G06K 7/14* (2006.01)
(Continued)

(52) U.S. Cl.
CPC ....... *G06Q 30/0619* (2013.01); *G06K 7/1413* (2013.01); *G06Q 20/0855* (2013.01);
(Continued)

(58) Field of Classification Search
CPC .......... G06Q 30/0619; G06Q 30/0639; G06Q 20/3276; G06Q 20/18; G06Q 20/3224;
(Continued)

(56) References Cited

U.S. PATENT DOCUMENTS

| 8,489,469 B1 | 7/2013 | Elberbaum |
| 2002/0004689 A1 | 1/2002 | Yamazaki et al. |

(Continued)

FOREIGN PATENT DOCUMENTS

| CA | 2843895 A1 * | 2/2013 | .............. G07F 11/00 |
| CN | 102063616 A | 5/2011 | |

(Continued)

OTHER PUBLICATIONS

First Search dated Apr. 23, 2019, issued in related Chinese Application No. 201710805490.6 (1 page).
(Continued)

*Primary Examiner* — Yogesh C Garg

(57) ABSTRACT

Embodiments of the specification disclose a transaction execution method, apparatus, and device applicable in a client terminal and a server. The transaction execution method includes: scanning an offline object and a corresponding identification code thereof, the identification code comprising positioning assistance information of the offline object; triggering a recognition process for the offline object and the identification code; and executing a transaction with respect to the offline object based on a result of the recognition process.

18 Claims, 7 Drawing Sheets

(51) Int. Cl.
*G06Q 20/08* (2012.01)
*G06Q 20/18* (2012.01)
*G06Q 20/32* (2012.01)

(52) U.S. Cl.
CPC ......... *G06Q 20/18* (2013.01); *G06Q 20/3224* (2013.01); *G06Q 20/3276* (2013.01); *G06Q 30/0601* (2013.01); *G06Q 30/0639* (2013.01)

(58) Field of Classification Search
CPC ............... G06Q 20/0855; G06Q 20/08; G06Q 30/0601; G06K 7/1413
USPC .............................................. 705/26.44, 26.9
See application file for complete search history.

(56) References Cited

U.S. PATENT DOCUMENTS

| | | | |
|---|---|---|---|
| 2003/0057276 A1* | 3/2003 | Appalucci | G06K 7/0004 235/382 |
| 2006/0247823 A1 | 11/2006 | Boucher | |
| 2008/0262649 A1 | 10/2008 | Allinson et al. | |
| 2008/0296382 A1* | 12/2008 | Connell, II | G06K 9/6293 235/462.01 |
| 2010/0078290 A1 | 4/2010 | Chang | |
| 2010/0237091 A1 | 9/2010 | Garson et al. | |
| 2013/0144428 A1 | 6/2013 | Irwin et al. | |
| 2013/0151006 A1 | 6/2013 | Garson et al. | |
| 2013/0223682 A1 | 8/2013 | Sugasawa et al. | |
| 2013/0275314 A1 | 10/2013 | Bowles | |
| 2013/0332312 A1 | 12/2013 | Segal et al. | |
| 2014/0025584 A1 | 1/2014 | Lui et al. | |
| 2014/0247278 A1* | 9/2014 | Samara | G06K 17/0016 345/633 |
| 2015/0106295 A1 | 4/2015 | Robinson et al. | |
| 2015/0112826 A1 | 4/2015 | Crutchfield, Jr. | |
| 2015/0186840 A1 | 7/2015 | Torres et al. | |
| 2015/0235202 A1* | 8/2015 | Zabala | G07F 9/001 700/232 |
| 2017/0309113 A1 | 10/2017 | Iwamoto et al. | |
| 2018/0174125 A1 | 6/2018 | Mao et al. | |
| 2020/0074443 A1 | 3/2020 | Yang et al. | |

FOREIGN PATENT DOCUMENTS

| | | | | |
|---|---|---|---|---|
| CN | 103295067 | A | 9/2013 | |
| CN | 105225344 | A | 1/2016 | |
| CN | 105825583 | A | 8/2016 | |
| CN | 106251154 | A * | 12/2016 | ............. G06Q 30/00 |
| CN | 106781017 | A | 5/2017 | |
| CN | 107784339 | U | 3/2018 | |
| KR | 10-2011-0019406 | A | 2/2011 | |
| TW | M519294 | A | 3/2016 | |
| TW | M544054 | U | 6/2017 | |
| TW | M545965 | U | 7/2017 | |

OTHER PUBLICATIONS

Supplemental Search dated Dec. 25, 2019, issued in related Chinese Application No. 201710805490.6 (1 page).
Extended European Search Report dated Apr. 20, 2020, issued in related European Application No. 18853849.0 (3 pages).
Search Report dated May 29, 2019, issued in related Taiwan Application No. 107118648 (1 page).
PCT International Search Report and the Written Opinion dated Oct. 31, 2018, issued in related International Application No. PCT/CN2018/103732, with partial English translation (9 pages).
PCT International Preliminary Report on Patentability dated Mar. 19, 2020, issued in related International Application No. PCT/CN2018/103732, with English machine translation (12 pages).
Written Opinion for Singaporean Application No. 11201910678Y dated Sep. 23, 2020.
Examination Report issued in India Application No. 201947046247, dated May 6, 2021, 8 pages.

* cited by examiner

SERVICE EXECUTION METHOD, APPARATUS, AND DEVICE FOR USE IN CLIENT TERMINAL AND SERVER

CROSS-REFERENCE TO RELATED APPLICATIONS

The present application is a continuation application of International Patent Application No. PCT/CN2018/103732, filed on Sep. 3, 2018, which is based on and claims priority to the Chinese Patent Application No. 201710805490.6, filed on Sep. 8, 2017 and entitled "SERVICE EXECUTION METHOD, APPARATUS, AND DEVICE FOR USE IN CLIENT TERMINAL AND SERVER." The above-referenced applications are incorporated herein by reference in their entirety.

TECHNICAL FIELD

The specification relates to the technical field of computer software, and in particular, to a transaction execution method, apparatus, and device applicable in a client terminal and a server.

BACKGROUND

IoT is an important part of new generation information technologies. A core and foundation of IoT is the Internet. Through IoT, a user can be associated with an offline object, enabling information exchange and communication based on the association, and implementation of multiple types of transactions.

A vending transaction is taken as an example. In existing technologies, a user may browse commodities on a vending machine, and then scan a two-dimensional barcode or Quick Response (QR) code provided on the vending machine, to enter a corresponding webpage to select a desired commodity, and pay for the purchase. Then the vending machine delivers the commodity out, and the user picks up the commodity. In this process, in fact, a user terminal is connected to the commodity and then executes the transaction.

With respect to the existing technologies, a more convenient transaction execution solution based on an IoT connection is needed.

SUMMARY

Embodiments of the specification provide a transaction execution method, apparatus, and device applicable in a client terminal and a server, to achieve a more convenient transaction execution solution based on an IoT connection.

Some embodiments of the specification provide a transaction execution method applicable in a client terminal, including: scanning an offline object and a corresponding identification code thereof, the identification code comprising positioning assistance information of the offline object; triggering a recognition process for the offline object and the identification code; and executing a transaction with respect to the offline object based on a result of the recognition process.

In some embodiments, scanning the offline object and the corresponding identification code thereof comprises: scanning the offline object and the corresponding identification code thereof in a same scanning view frame.

In some embodiments, the triggering a recognition process for the offline object and the identification code comprises: recognizing an image obtained through the scanning of the offline object, to obtain item information of the offline object; and performing feature extraction and analysis on the scanned identification code, to recognize the positioning assistance information of the offline object.

In some embodiments, the recognizing an image obtained through scanning of the offline object, to obtain item information of the offline object comprises: performing feature extraction on the image obtained through the scanning of the offline object; and sending an extracted feature of the image to a server, for the server to recognize the item information of the offline object by performing feature comparison of the extracted feature of the image.

In some embodiments, the performing feature extraction and analysis on the scanned identification code, to recognize the positioning assistance information of the offline object comprises: recognizing the positioning assistance information of the offline object, and sending the positioning assistance information to a server.

In some embodiments, the executing a transaction with respect to the offline object based on a result of the recognition process comprises: obtaining an association relationship between a current user and the offline object, the association relationship being determined based on the result of the recognition process; and executing the transaction with respect to the offline object according to the association relationship.

In some embodiments, the offline object comprises at least one commodity displayed in a vending machine, the identification code is displayed in the vending machine, and the positioning assistance information comprises identification information of the vending machine; and the executing a transaction with respect to the offline object based on a result of the recognition process comprises: paying for the at least one commodity using a payment account of the current user according to the association relationship; and enabling the at least one commodity in the vending machine to be delivered to a pick-up port.

In some embodiments, the paying for the at least one commodity using a payment account of the current user according to the association relationship comprises: determining a to-be-paid order generated by the server for the at least one commodity according to the association relationship; and paying for the to-be-paid order using the payment account of the current user.

Some embodiments of the specification provide a transaction execution method applicable in a server, including: obtaining a recognition result corresponding to a recognition process triggered by a client terminal, the recognition process being performed for an offline object and a corresponding identification code thereof that are scanned by the client terminal, and the identification code comprising positioning assistance information of the offline object; and executing a transaction with respect to the offline object according to the recognition result.

Some embodiments of the specification provide another transaction execution method applicable in a client terminal, including: scanning and recognizing an identification code to generate a recognition result, the identification code comprising positioning assistance information of a corresponding offline object; determining a target offline object of a current user according to the recognition result; and executing a transaction with respect to the target offline object.

In some embodiments, the scanning and recognizing an identification code to generate a recognition result comprises: scanning the identification code in a scanning view frame.

In some embodiments, the determining a target offline object of a current user according to the recognition result comprises: determining whether an identification code is successfully scanned and recognized in a specified area of the scanning view frame; in response to determining that an identification code is successfully scanned and recognized in a specified area of the scanning view frame, determining that an offline object corresponding to the identification code in the specified area is the target offline object of the current user; and in response to determining that an identification code is not successfully scanned and recognized in a specified area of the scanning view frame, determining the target offline object of the current user according to a relative position relationship between one or more other scanned and recognized identification codes and the specified area.

In some embodiments, the determining the target offline object of the current user according to a relative position relationship between the one or more other scanned and recognized identification codes and the specified area comprises: determining two scanned and recognized identification codes adjacent to the specified area; determining, according to a relative position relationship between the two identification codes and the specified area and a recognition result with respect to the two identification codes, positioning assistance information comprised in an identification code corresponding to the target offline object of the current user; and determining the target offline object according to the determined positioning assistance information.

In some embodiments, the executing a transaction with respect to the target offline object comprises: obtaining an association relationship between the current user and the target offline object, the association relationship being determined based on positioning assistance information comprised in an identification code corresponding to the target offline object; and executing the transaction with respect to the target offline object according to the association relationship.

In some embodiments, the offline object comprise a commodity displayed in a vending machine, the identification code is displayed in the vending machine, and the positioning assistance information of the offline object comprises identification information of the vending machine and position information of the commodity in the vending machine; and the executing the transaction with respect to the target offline object according to the association relationship comprises: determining a to-be-paid order for the commodity according to the association relationship; and paying for the to-be-paid order using a payment account of the current user.

Some embodiments of the specification provide a transaction execution apparatus, applicable in a client terminal, including: a scanning module configured to scan an offline object and a corresponding identification code thereof, the identification code including positioning assistance information of the offline object; a recognition module configured to trigger a recognition process for the offline object and the identification code that are scanned; and a transaction module configured to execute a transaction with respect to the offline object based on the recognition process.

Some embodiments of the specification provide a transaction execution apparatus. The transaction execution apparatus comprises: one or more processors and one or more non-transitory computer-readable memories coupled to the one or more processors and configured with instructions executable by the one or more processors to cause the apparatus to perform operations comprising: scanning an offline object and a corresponding identification code thereof, the identification code comprising positioning assistance information of the offline object; triggering a recognition process for the offline object and the identification code; and executing a transaction with respect to the offline object based on a result of the recognition process.

Some embodiments of the specification provide a transaction execution apparatus, applicable in a server, comprising: an obtaining module configured to obtain a recognition result corresponding to a recognition process triggered by a client terminal, the recognition process being performed for an offline object and a corresponding identification code thereof that are scanned by the client terminal, and the identification code comprising positioning assistance information of the offline object; and a transaction module configured to execute a transaction with respect to the offline object according to the recognition result.

Some embodiments of the specification provide another transaction execution apparatus, applicable in a client terminal, comprising: a scanning and recognition module configured to scan and recognize one or more identification codes, the identification code comprising positioning assistance information of a corresponding offline object thereof; a determining module configured to determine a target offline object of a current user according to a recognition result; and a transaction module configured to execute a transaction with respect to the target offline object.

Some embodiments of the specification provide a transaction execution device, applicable in a client terminal, comprising: at least one processor; and a memory communicatively connected to the at least one processor; where the memory stores instructions executable by the at least one processor, and the instructions, when executed by the at least one processor, cause the at least one processor to perform the operations comprising: scanning an offline object and a corresponding identification code thereof, the identification code including positioning assistance information of the offline object; triggering a recognition process for the offline object and the identification code that are scanned; and executing a transaction with respect to the offline object based on the recognition process.

Some embodiments of the specification provide a transaction execution device, applicable in a terminal, comprising: at least one processor; and a memory communicatively connected to the at least one processor; where the memory stores instructions executable by the at least one processor, and the instructions, when executed by the at least one processor, cause the at least one processor to perform the operations comprising: obtaining a recognition result corresponding to a recognition process triggered by a client terminal, the recognition process being performed for an offline object and a corresponding identification code thereof that are scanned by the client terminal, and the identification code comprising positioning assistance information of the offline object; and executing a transaction with respect to the offline object according to the recognition result.

Some embodiments of the specification provide another transaction execution device, applicable in a client terminal, comprising: at least one processor; and a memory communicatively connected to the at least one processor; where the memory stores instructions executable by the at least one processor, and the instructions, when executed by the at least one processor, cause the at least one processor to perform the operations comprising: scanning and recognizing one or more identification codes, the identification code including positioning assistance information of a corresponding offline object thereof; determining a target offline object of a current user according to a recognition result; and executing a transaction with respect to the target offline object.

The foregoing embodiments of the specification can achieve the following beneficial effects: the offline object and the corresponding identification code thereof are scanned and recognized, so that an IoT connection between the user terminal and the offline object can be more conveniently implemented without a need for a user to select the offline object, and a transaction with respect to the offline object can be executed more conveniently. Therefore, the foregoing technical problem can be partially or completely resolved.

BRIEF DESCRIPTION OF THE DRAWINGS

To describe the technical solutions of the embodiments of the specification or the existing technologies more clearly, the following briefly introduces the accompanying drawings for describing the embodiments or the existing technologies. Apparently, the accompanying drawings in the following description show only some embodiments of the specification, and a person of ordinary skill in the art may still derive other drawings from these accompanying drawings without creative efforts.

DETAILED DESCRIPTION

Embodiments of the specification provide a transaction execution method, apparatus, and device applicable in a client terminal and a server.

To enable a person skilled in the art to better understand the technical solutions of the specification, the technical solutions of the embodiments of the specification will be described clearly and thoroughly below with reference to the accompanying drawings of the embodiments of the specification. Apparently, the described embodiments are merely some embodiments of this application but are not all of the embodiments. All other embodiments obtained by a person of ordinary skill in the art based on the embodiments of the specification without creative efforts shall fall within the protection scope of this application.

In a solution of the specification, an identification code corresponding to an offline object is provided, the identification code including positioning assistance information of the offline object. In some embodiments, the offline object may be a commodity, or a product. A sale transaction may be performed for the offline object. In other embodiments, the offline object may be other items not for sale.

A vending transaction is taken as an example. For example, the offline object may be a commodity in the vending machine, and the positioning assistance information may be identification information of the vending machine, etc. Then, a vending machine in which the commodity is located may be determined using the positioning assistance information. In some embodiments, the positioning assistance information may further include more content, for example, information about a delivering channel of the commodity in the vending machine, etc.

The positioning assistance information of the offline object is stored in the identification code through arrangement and combination of some code elements using a non-universal or universal coding standard. The name of the identification code is not limited in this application, and may be named according to an actual requirement, for example, may be referred to as a hidden code, a feature code, etc.

The specification mainly includes two types of solutions. In one type of solutions, an offline object and a corresponding identification code thereof are scanned and recognized to implement an IoT connection between a user terminal and the offline object, and therefore a transaction can be executed. In the other type of solutions, an offline object may not need to be scanned. Instead, a corresponding identification code of the offline object is scanned and recognized, to implement an IoT connection between a user terminal and the offline object, and therefore a transaction can be executed. In the two types of solutions, content of the positioning assistance information included in the identification code may be different.

Figure 1:
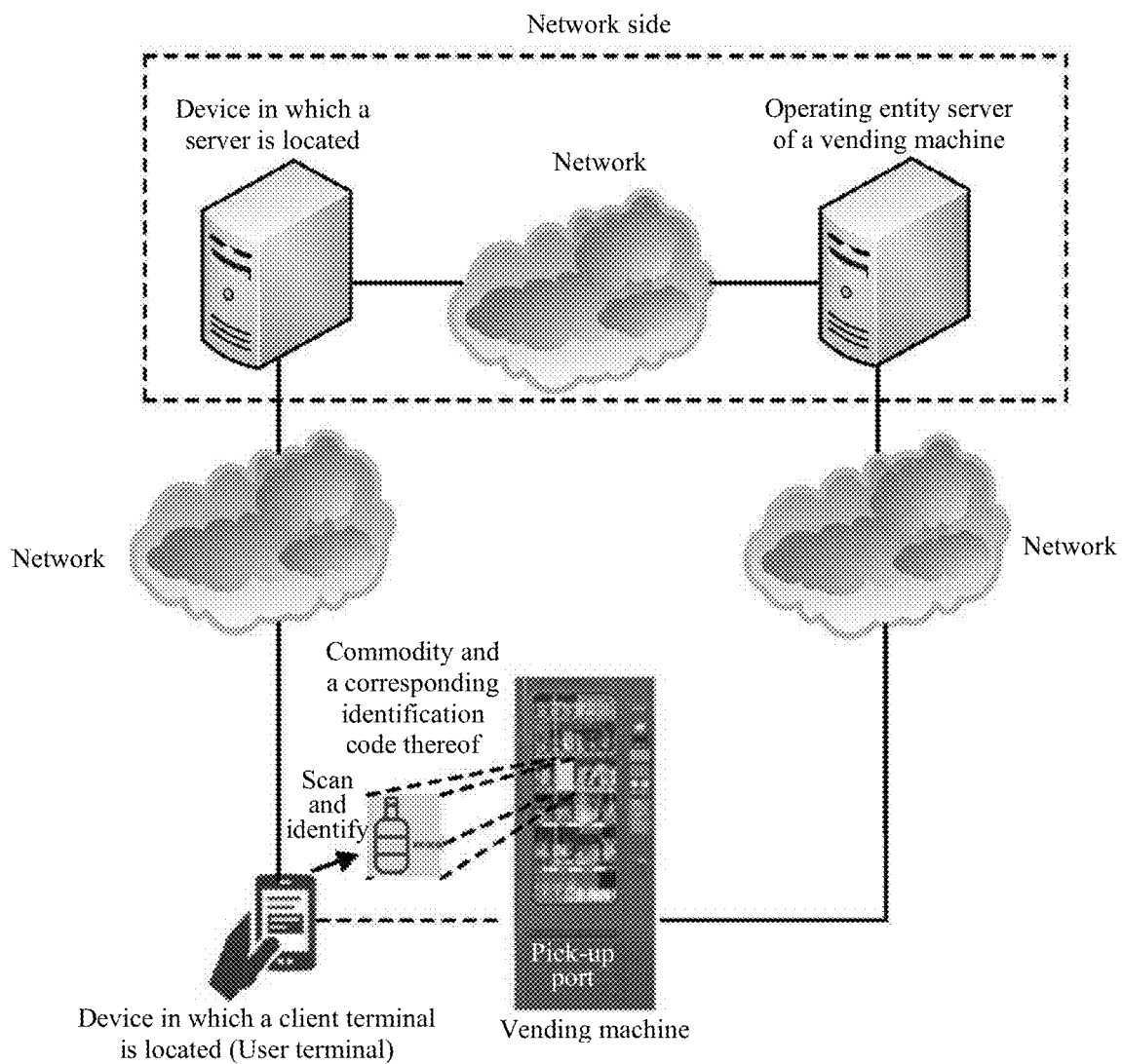
FIG. 1 is a schematic diagram of an overall architecture used in an actual application scenario according to some embodiments of the specification.

FIG. 1 is a schematic diagram of an overall architecture used in an actual application scenario according to some embodiments of the specification. The overall architecture includes four parts: a device on which a client terminal is located, a device on which a server is located, a vending machine, and an operating entity server of the vending machine. The client terminal and the server may correspond to the same application, for example, a payment application or an instant messaging application, and an operating entity of the application and an operating entity of the vending machine may be different entities or the same entity. When the operating entity of the application and the operating entity of the vending machine are the same, the device in which the server is located and the operating entity server of the vending machine may be the same device.

The vending machine displays a to-be-sold commodity and an identification code corresponding to the commodity. If a current user wants to purchase the commodity, the user scans and identifies the commodity and the corresponding identification code thereof through cooperation of the client terminal and the server, so as to implement an IoT connection, and then pays for the commodity. Then, the vending machine is enabled to deliver the commodity to a pick-up port with the cooperation of the operating entity of the vending machine, and the user obtains the commodity. This manner simplifies user operations and is more convenient.

The architecture in FIG. 1 is exemplary. If a user terminal and/or a vending machine have/has sufficient functions, devices on a network side are not necessarily required. For example, if the user terminal can directly establish a connection to the vending machine and execute a transaction, the device on the network side is not required. In another example, if a device on which the server is located can directly establish a connection to the vending machine and can help the user terminal execute a transaction, an operating entity server of the vending machine is not required, and so on.

The following describes the solutions of the specification in detail based on the foregoing brief description and the overall architecture.

Figure 2:
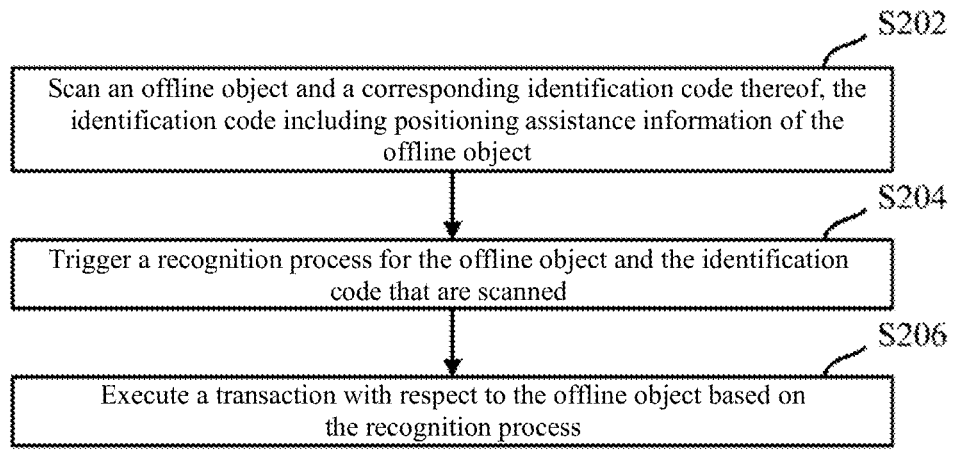
FIG. 2 is a schematic flowchart of a transaction execution method applicable in a client terminal according to some embodiments of the specification.

FIG. 2 is a schematic flowchart of a transaction execution method applicable in a client terminal according to some embodiments of the specification. A possible execution body of the method includes, but is not limited to, the following devices that can include a client terminal: a mobile phone, a tablet computer, a smart wearable device, a personal computer, etc.

For ease of description, the following embodiments are mainly described based on an automatic vending transaction scenario. The method in FIG. 2 includes the following steps.

S202: An offline object and a corresponding identification code thereof are scanned, the identification code including positioning assistance information of the offline object.

In some embodiments of the specification, the vending machine displays both a to-be-sold commodity and an identification code corresponding to the commodity. Displaying a commodity may be directly displaying a commodity, or may be displaying a model of a commodity showing an appearance of the commodity.

In some embodiments, a commodity and a corresponding identification code thereof are relatively close in position, so that a current user can scan the commodity and the identification code simultaneously through one scanning.

In some embodiments of the specification, the positioning assistance information directly or indirectly indicates a position of the offline object. In some embodiments, the position is represented based on another offline object whose position is known, such as a vending machine or the like. For example, the positioning assistance information may include identification information of a vending machine in which a corresponding commodity is located. Since a position of the vending machine is known, the positioning assistance information is deemed as relative position information of the commodity. The positioning assistance information may further include position information of the vending machine. In some embodiments, the positioning assistance information may also include other forms of position information such as coordinate information of the commodity or the vending machine, etc.

A current user usually performs a scanning operation using a camera of the terminal. Scanning of the offline object is intended to perceive what the offline object is. For example, the offline object is a bottle of juice of a brand or a type of drinking water of a brand. From a perspective of a user, what the user sees is what the user gets. Scanning of the identification code is intended to detect where the offline object is, for example, in which vending machine the offline object is located. Therefore, an IoT connection may be implemented.

S204: A recognition process is triggered for the offline object and the identification code that are scanned.

In some embodiments of the specification, the recognition process may be performed by the client terminal independently, or may be performed by the server independently, or may be performed through cooperation of the client terminal and the server. In the following embodiments, the last manner is taken as an example.

For example, the scanned identification code may be independently recognized by the client terminal. Because relatively few processing resources are needed, the client terminal is qualified for this. For recognition of the scanned offline object, because comparison to a feature library or an image library is involved, relatively more processing resources are needed. Therefore, the server may be needed to help complete at least a part of work to reduce the processing pressure on the client terminal, thereby facilitating efficient recognition. For example, a feature of an offline object's image obtained through scanning may be extracted by the client terminal, and then feature comparison is performed by the server to obtain an image recognition result. In another example, the client terminal may merely obtain an offline object image through scanning, and the server performs image comparison to obtain an image recognition result, and so on.

S206: A transaction with respect to the offline object is executed based on the recognition process.

In some embodiments of the specification, based on the recognition process, association between a user and the offline object (which may also be referred to as an IoT connection between the user terminal and the offline object) may be implemented, and therefore a transaction may be executed.

The transaction with respect to the offline object may be completed through cooperation of the client terminal and one or more other terminals (for example, a server, a vending machine, an operating entity server of the vending machine, etc.).

In some embodiments, in addition to an automatic vending transaction, the solutions of the specification may also be applied to other transactions in which the IoT technologies may be used. For example, in the scenario of an automatic leasing transaction, the offline object is a to-be-leased book, a to-be-leased sports equipment, etc. In another example, in the scenario of a daily life payment transaction, the offline object is an electricity meter, a water meter, a gas meter, etc.

In the method shown in FIG. 2, the offline object and the corresponding identification code thereof are scanned and recognized, so that an IoT connection between the user terminal and the offline object can be more conveniently implemented without a need for a user to select the offline object online, and a transaction with respect to the offline object can be executed more conveniently. Therefore, the foregoing technical problem can be partially or completely resolved.

Based on the method shown in FIG. 2, embodiments of the specification further provide some implementations of the method and extended solutions, which are described below.

In some embodiments of the specification, at step S202, during scanning of the offline object and the corresponding identification code thereof, the offline object and the corresponding identification code thereof may be included in a same scanning view frame. The same scanning view frame may be a framing range of a camera used by a current user to scan the offline object and the corresponding identification code thereof.

For example, the vending machine displays a plurality of commodities, and a corresponding identification code is displayed near each commodity. During scanning by the current user, the camera is aligned at a commodity and a corresponding identification code, so that the framing range of the camera includes a to-be-purchased commodity and a corresponding identification code thereof. In some embodiments, there is a frame in a framing range of a camera for helping alignment during scanning of a two-dimensional barcode or QR code. Similarly, in some embodiments of the specification, there may also be prompt information such as a frame for helping alignment. Thus, a current user can place a to-be-purchased commodity and a corresponding identification code thereof in the frame, and prevent irrelevant commodities and identification codes to be included in the frame as much as possible, to avoid scanning and recognition of a wrong object.

A scanning and recognition result may be prompted to the current user, so as to confirm there is no error. The current user can determine whether the commodity is correct. If there is an error, the current user can retry the scanning.

In some embodiments of the specification, at step S204, the triggering a recognition process for the offline object and the identification code that are scanned may include: recognizing an image obtained through scanning of the offline object, to obtain item information of the offline object; and performing feature extraction and analysis on the identification code that are scanned, to recognize the positioning assistance information of the offline object.

Further, the recognizing an image obtained through scanning of the offline object, to obtain item information of the offline object may include: performing, by the client terminal, feature extraction on the image obtained through scanning the offline object; and sending the extracted image feature to a server, for the server to recognize the item information of the offline object by performing feature comparison of the image feature.

The recognizing the positioning assistance information of the offline object includes: recognizing, by the client terminal, the positioning assistance information of the offline object, and sending the positioning assistance information to the server.

Through the foregoing processing logic, the server can obtain a recognition result corresponding to the foregoing recognition process.

In some embodiments, a corresponding interface or an SDK may be developed to implement the processing logic in the recognition process, so that the interface or the SDK may be reused in other scenarios, thereby reducing implementation costs. For ease of understanding, descriptions are provided with reference to the drawings.

Figure 3:
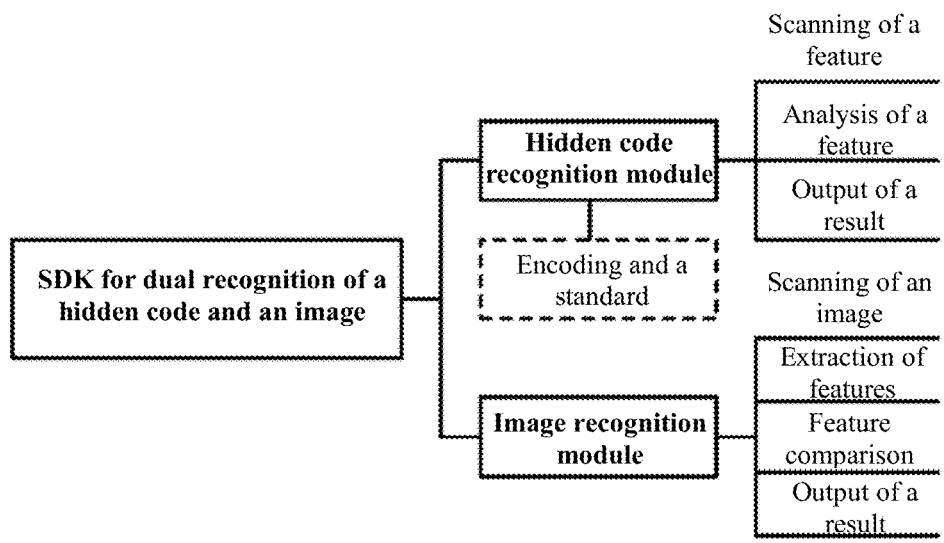
FIG. 3 is a schematic diagram of a software development kit (SDK) for dual recognition of a hidden code and an image according to some embodiments of the specification.

FIG. 3 is a schematic diagram of a software development kit (SDK) for dual recognition of a hidden code and an image according to some embodiments of the specification. The hidden code is the foregoing identification code, for example, a quick response (QR) identification code similar to a two-dimensional barcode. The image is the foregoing image obtained through scanning of the offline object.

The SDK shown in FIG. 3 includes a hidden code recognition module and an image recognition module. The hidden code is coded based on some standard. The standard may be non-universal, and therefore has relatively good confidentiality. For example, the standard may be formulated by an Research and Development (R&D) party of the SDK, and is used for some products of the party privately, not in public.

Functions of the hidden code recognition module mainly include: scanning features of the hidden code, analyzing the features, outputting a result, etc. Functions of the image recognition module mainly include: scanning the offline object to obtain a corresponding image, extracting features of the image, performing feature comparison, outputting a result, etc.

These processing logics of the SDK are not necessarily executed on the client terminal, and some processing logics may be executed by the server through interaction between the client terminal and the server.

Figure 4:
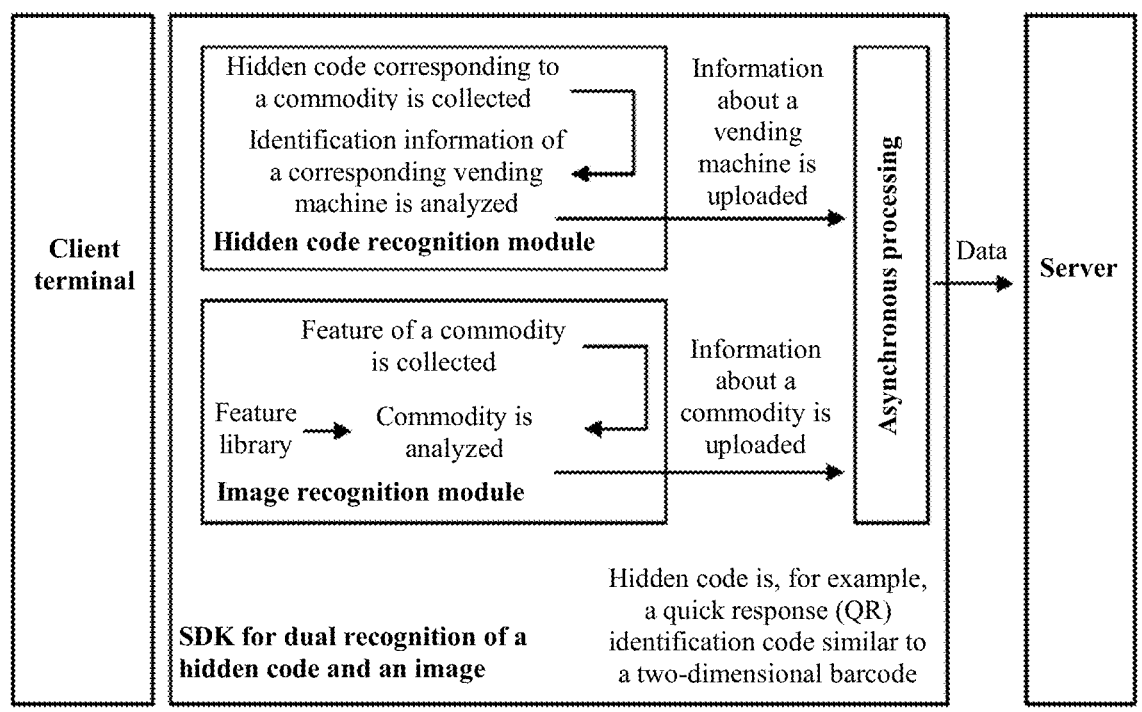
FIG. 4 is a schematic diagram of a working process of an SDK in FIG. 3 in an automatic vending transaction scenario according to some embodiments of the specification.

Further, FIG. 4 is a schematic diagram of a working process of an SDK in FIG. 3 in an automatic vending transaction scenario according to some embodiments of the specification.

As shown in FIG. 4, a current user scans a commodity and a corresponding identification code thereof using a camera. Next, on the one hand, the hidden code recognition module collects a hidden code, and analyzes the hidden code to obtain identification information of a vending machine in which the commodity is currently located; on the other hand, the image recognition module scans the commodity to obtain an image of the commodity, collects features of the commodity, and analyzes the commodity through feature comparison in a feature library to obtain commodity information. In this way, the two functions of recognizing a hidden code and an image are implemented in one scanning interface.

In addition, after being asynchronously processed, results of the two modules are uploaded to the server for a subsequent transaction. In some embodiments, if the server has already recognized a part of the recognition results, the client terminal may not upload this part of the recognition results.

Figure 5:
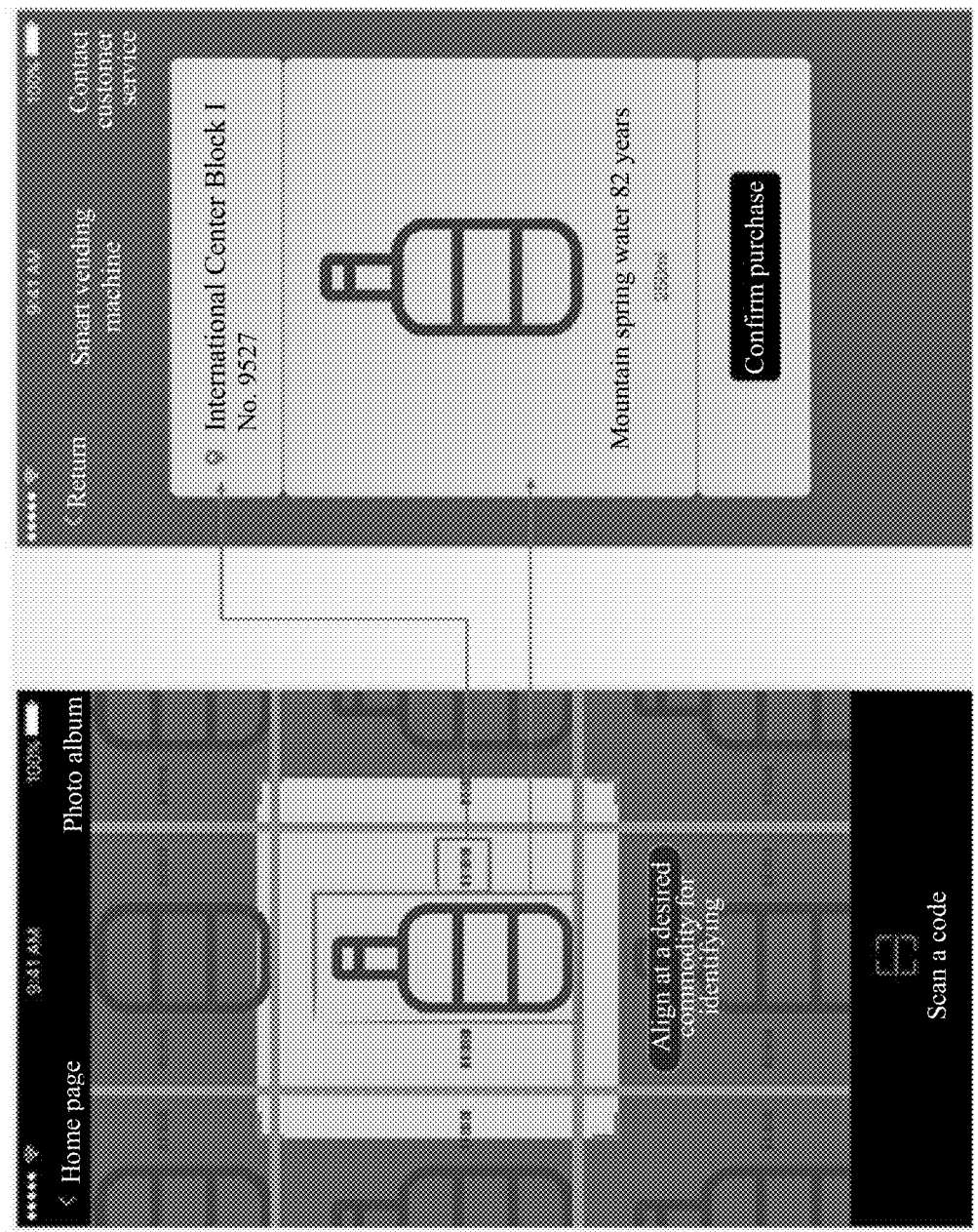
FIG. 5 is a schematic diagram of a scanning interface and a recognition result interface of a commodity and an identification code thereof in an automatic vending transaction scenario according to some embodiments of the specification.

Furthermore, FIG. 5 is a schematic diagram of a scanning interface and a recognition result interface of a commodity and an identification code thereof in an automatic vending transaction scenario according to some embodiments of the specification.

In FIG. 5, a scanning interface is shown on the left side. Bottle shaped figures represent to-be-sold beverage commodities (e.g., commodities or models of commodities). Identification codes corresponding to the beverage commodities are the same, and are displayed on both sides of the beverage commodities. A current camera is aligned at one of the beverage commodities and an identification code thereof.

A recognition result is displayed at an interface on the right side. The recognition result includes two parts. The upper part is positioning assistance information (some of which is omitted) recognized from the identification code: "International Center Block I, No. 9527", that is, a position and a serial number of a vending machine. The lower part is item information recognized from the commodity (some of which is omitted): "Mountain spring water 82 years, 250 ml." The current user may further pay for the commodity by taping a "Confirm purchase" button at the bottom.

In some embodiments of the specification, an account of the current user is logged in on the client terminal. For example, the client terminal is a client terminal of a payment application. Then, the account may be correspondingly a payment account.

After the current user scans the identification code of offline object using the client terminal, an association relationship between the current user and the offline object is therefore established. That is, an IoT connection is implemented. Subsequent operations may be performed based on the association relationship.

Thus, at step S206, executing a transaction with respect to the offline object based on the recognition process may include: obtaining an association relationship between a current user and the offline object, the association relationship being determined by the client terminal or the server based on a recognition result corresponding to the recognition process; and executing the transaction with respect to the offline object according to the association relationship.

In an automatic vending transaction scenario, at step S202, the offline object includes at least one commodity displayed in a vending machine, the identification code is also displayed in the vending machine, and the positioning assistance information includes identification information of the vending machine. The executing the transaction with respect to the offline object according to the association relationship may include: paying for the at least one commodity using a payment account of the current user according to the association relationship, and enabling the at least one commodity in the vending machine to be delivered to a pick-up port.

In some embodiments, the server generates a to-be-paid order for the at least one commodity according to the association relationship, and provides information about the to-be-paid order to the client terminal. The client terminal pays for to-be-paid order using a payment account of the current user. After determining that the payment is completed, the server sends an instruction to an operating entity of a corresponding vending machine (for example, sends the recognition result to an operating entity server) according to the foregoing recognition result. The operating entity server finds the corresponding vending machine according to the instruction, and enables the vending machine to deliver the corresponding commodity to the pick-up port.

In foregoing embodiments, the vending machine delivers the commodity after the payment is completed. However, other manners are possible. For example, if a credit limit of the current user is not lower than a threshold, the vending machine may be enabled to first deliver the commodity before the payment is performed.

Figure 6:
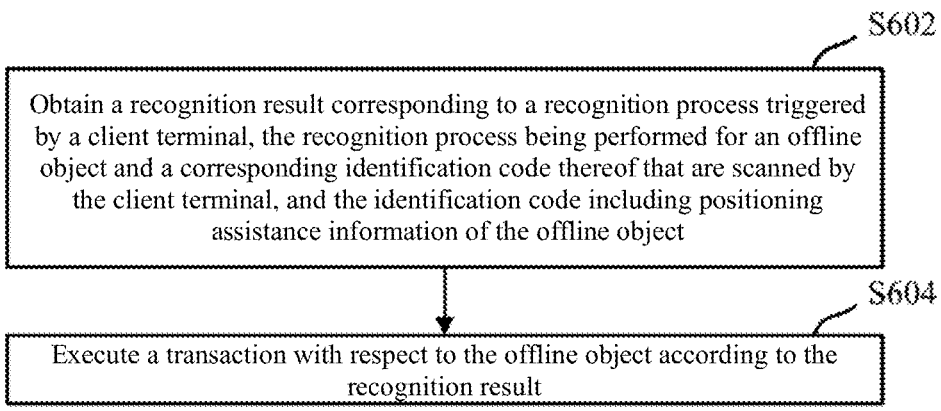
FIG. 6 is a schematic flowchart of a transaction execution method applicable in a server according to some embodiments of the specification.

The method shown in FIG. 2 is mainly described from a perspective of the client terminal. Based on the same ideas, embodiments of the specification further provide a schematic flowchart of a transaction execution method applicable in a server according to some embodiments of the specification, as shown in FIG. 6. A possible execution body of the method includes, but is not limited to, the following devices that can implement a server: a personal computer, a mainframe, a computer cluster, etc. The method shown in FIG. 6 includes the following steps.

S602: A recognition result corresponding to a recognition process triggered by a client terminal is obtained, the recognition process being performed for an offline object and a corresponding identification code thereof that are scanned by the client terminal, and the identification code including positioning assistance information of the offline object.

S604: A transaction with respect to the offline object is executed according to the recognition result.

In some embodiments of the specification, at step S604, the executing a transaction with respect to the offline object according to the recognition result may include: obtaining an association relationship between a current user and the offline object, the association relationship being determined by the client terminal or the server based on the recognition result corresponding to the recognition process, and the recognition result including item information and the positioning assistance information of the offline object; and executing the transaction with respect to the offline object according to the association relationship.

In some embodiments of the specification, the offline object includes at least one commodity displayed in a vending machine, the identification code also being displayed in the vending machine, and the positioning assistance information including identification information of the vending machine. The executing the transaction with respect to the offline object according to the association relationship may include: generating a to-be-paid order for the at least one commodity according to the association relationship, and sending the order to the client terminal, for the client terminal to pay for the to-be-paid order using the payment account of the current user.

Further, the executing the transaction with respect to the offline object according to the association relationship may further include: submitting an instruction to an operating entity of the vending machine based on the recognition result, for the operating entity to enable the vending machine to deliver the at least one commodity to the pick-up port.

In the foregoing embodiments, the transaction is executed based on scanning and recognition of an offline object and a corresponding identification code thereof.

As mentioned above, identification of the offline object is intended to perceive what the offline object is and to achieve, for a user, what the user sees is what the user gets. In another type of solutions, if the identification code includes sufficiently detailed information, the offline object may not be scanned and recognized, but the identification code is scanned and recognized.

In the first type of embodiments, identification codes corresponding to different offline objects may be the same. For example, all commodities in the same vending machine may correspond to the same identification code, and the identification code may include only common information of all the commodities as positioning assistance information, such as identification information, position information, etc. of the vending machine. How to further distinguish all the commodities may rely on recognized item information of the commodities.

In the other type of solutions, identification codes corresponding to different offline objects are usually different, and positioning assistance information recognized from the identification code is sufficient to distinguish between different offline objects. Detailed description is provided below.

Figure 7:
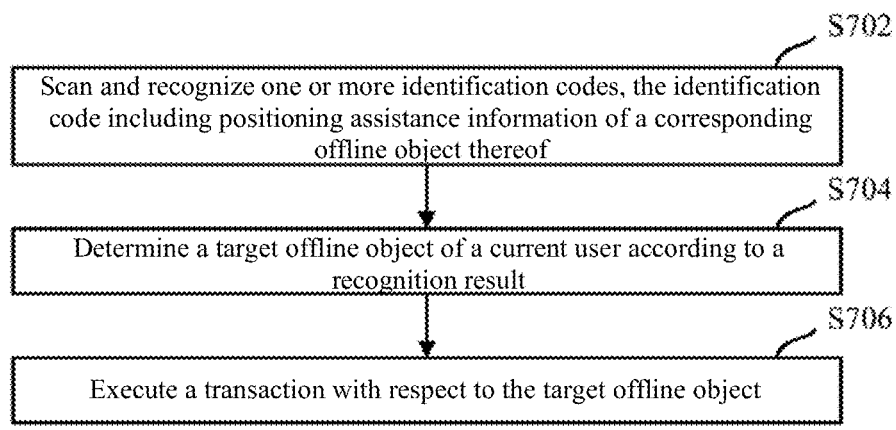
FIG. 7 is a schematic flowchart of another transaction execution method applicable in a client terminal according to some embodiments of the specification.

FIG. 7 is a schematic flowchart of another transaction execution method applicable in a client terminal according to some embodiments of the specification. The method includes the following steps.

S702: One or more identification codes are scanned and recognized, the identification code including positioning assistance information of a corresponding offline object thereof.

In some embodiments of the specification, there is a box in a scanning view frame of the camera to help a user in alignment, and the area in the box is referred to as a specified area.

In some embodiments, when alignment of the camera is relatively accurate during scanning, and the specified area includes only an identification code corresponding to one offline object, the identification code in the specified area is recognized. However, in some embodiments, if the identification code in the specified area is not successfully recognized (for example, the identification code is damaged or lost, etc.), an identification code outside the specified area may be recognized, and the identification code in the specified area is derived according to the recognition result, so that the solution has better robustness.

S704. A target offline object of a current user is determined according to a recognition result.

In some embodiments of the specification, the target offline object is an offline object in the specified area. If there is no prompt box, an offline object in the center of the scanning view frame may be considered as the target offline object.

S706. A transaction with respect to the target offline object is executed.

In some embodiments of the specification, the transaction may be executed based on position assistance information included in the identification code corresponding to the target offline object.

In some embodiments of the specification, at step S704, during scanning of the one or more identification codes, the one or more identification codes may be included in the same scanning view frame.

The determining a target offline object of a current user according to the recognition result may include: determining whether the identification code is successfully scanned and recognized in a specified area of the scanning view frame; and if yes, determining that an offline object corresponding to the identification code in the specified area is the target offline object of the current user; if not, determining the target offline object of the current user according to a relative position relationship between the scanned and recognized identification code and the specified area.

When there are multiple offline objects, the multiple offline objects are ranged in patterns in different transaction scenarios. For example, commodities are neatly arranged in rows and columns in a vending machine. When positions of the one or more of the offline objects are learned, positions of other adjacent offline objects may be derived on this basis, thereby helping alleviate identification failures of some identification codes. An example is provided with reference to FIG. 8.

Figure 8:
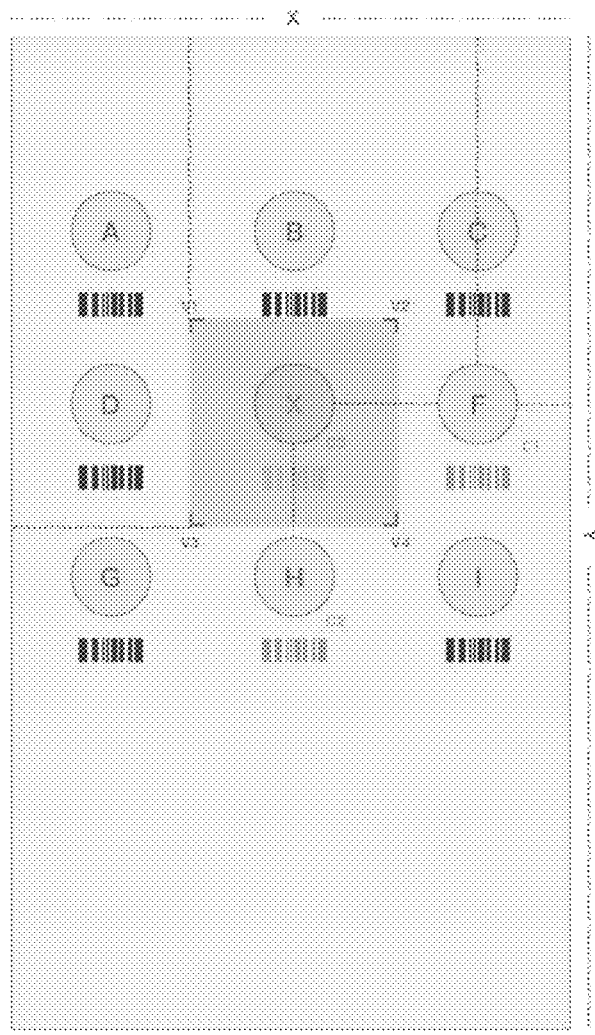
FIG. 8 is a schematic diagram of a solution for determining a target offline object according to some embodiments of the specification.

FIG. 8 is a schematic diagram of a solution for determining a target offline object according to some embodiments of the specification. As shown in FIG. 8, A~I respectively represent offline objects, and an identification code under each offline object is a corresponding identification code thereof, and $V_1$~$V_4$ identifies a frame-shaped specified area. It is assumed that the current coordinates of $V_1$~$V_4$ are respectively: $V_1(X_a,Y_a)$, $V_2(X_b,Y_a)$, $V_3(X_a,Y_b)$, and $V_4(X_b,Y_b)$.

For example, if an identification code in the specified area is not successfully recognized, positions of F and H may be determined through recognition of the identification codes corresponding to F and H respectively, thereby determining that X is in the specified area, that is, determining that X is the target offline object.

In some embodiments, it is assumed that a current coordinate of F is represented as $C_1(X_0,Y_0)$, and a current coordinate of H is represented as $C_2(X_1,Y_1)$. When the following conditions are met: for $C_1$, $(X_0>X_b)\&\&(Y_b<Y_0<Y_a)$, and for $C_2$, $(X_a<X_1<X_b)\&\&(Y_1<Y_b)$; and no other identification codes exist between the specified area and F as well as between the specified area and H, X may be determined to be the target offline object according to a predetermined offline object arrangement pattern. For example, if it is known that the offline object is arranged according to a matrix, F is at a second row and a third column, and H is at a third row and a second column, it may be determined that the target offline object is at a second row and a second column if the foregoing conditions are met.

In order to improve efficiency, a data table may be pre-established for a relative position relationship among the offline objects, and subsequently the data table may be queried for determining a target offline object. For example, a first data table stores the coordinates corresponding to the offline objects, and a second data table stores target offline objects each corresponding to any two offline objects. $C_1$=F, $C_2$=H, and $C_3$=X are obtained through querying of the first data table. Further, (F, H)=X is obtained through querying of the second data table. That is, it is determined that the target offline object is X.

As a summary of the foregoing example, the determining the target offline object of the current user according to a relative position relationship between the scanned and recognized identification code and the specified area may include: determining at least two scanned and recognized identification codes adjacent to the specified area; determining, according to a relative position relationship between the at least two identification codes and the specified area as well as a recognition result of the at least two identification codes, positioning assistance information included in an identification code corresponding to the target offline object corresponding to the current user; and determining the target offline object according to the determined positioning assistance information.

After the target offline object is determined, subsequent actions for executing the transaction are similar to those in FIG. 2 and FIG. 6. A main difference may be that content included in the positioning assistance information of the offline object is more accurate, and item information of the offline object may not need to be used as a basis. A brief description is provided below.

In some embodiments of the specification, at step S706, the executing a transaction with respect to the target offline object may include: obtaining an association relationship between the current user and the target offline object, the association relationship being determined by the client terminal or the server based on positioning assistance information included in an identification code corresponding to the target offline object; and executing the transaction with respect to the target offline object according to the association relationship.

In an automatic vending transaction scenario, the offline object includes at least one commodity displayed in a vending machine, the identification code is also displayed in the vending machine, and the positioning assistance information includes identification information of the vending machine and information of a position (for example, a specific delivering channel) of a corresponding commodity in the vending machine. The executing the transaction with respect to the offline object according to the association relationship may include: determining a to-be-paid order generated by the server for the at least one commodity according to the association relationship; and paying for the to-be-paid order using the payment account of the current user.

The vending machine delivers the at least one commodity to the pick-up port based on an instruction of the server to an operating entity of the vending machine, where the instruction is based on the positioning assistance information of the target offline object.

Figure 9:
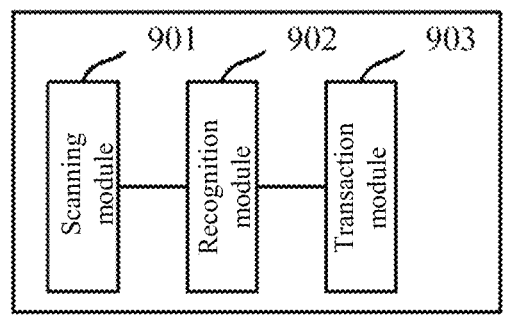
FIG. 9 is a schematic structural diagram of a transaction execution apparatus applicable in a client terminal and corresponding to the method in FIG. 2, according to some embodiments of the specification.
Figure 10:
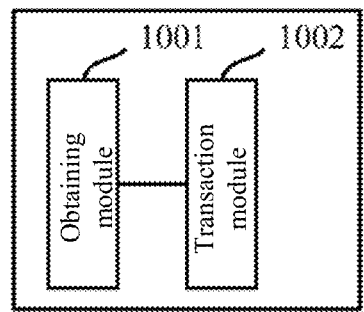
FIG. 10 is a schematic structural diagram of a transaction execution apparatus applicable in a server and corresponding to the method in FIG. 6, according to some embodiments of the specification.
Figure 11:
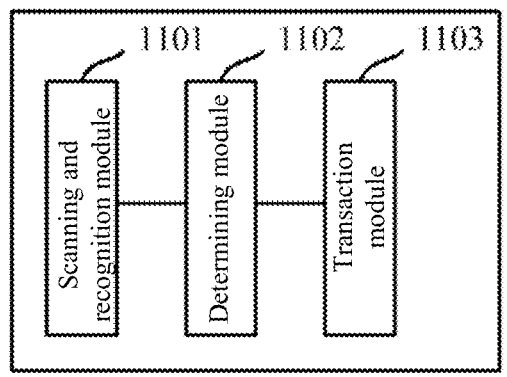
FIG. 11 is a schematic structural diagram of another transaction execution apparatus applicable in a client terminal corresponding to FIG. 7 according to some embodiments of the specification.

Based on the same ideas, embodiments of the specification further provide a corresponding apparatus, as shown in FIG. 9, FIG. 10, and FIG. 11.

FIG. 9 is a schematic structural diagram of a transaction execution apparatus applicable in a client terminal and corresponding to the method in FIG. 2, according to some embodiments of the specification. The apparatus may be located on an execution body of the method in FIG. 2. The apparatus in FIG. 9 may include: a scanning module 901 configured to scan an offline object and a corresponding identification code thereof, the identification code including positioning assistance information of the offline object; a recognition module 902 configured to trigger a recognition process for the offline object and the identification code that are scanned; and a transaction module 903 configured to execute a transaction with respect to the offline object based on the recognition process.

FIG. 10 is a schematic structural diagram of a transaction execution apparatus applicable in a server and corresponding to the method in FIG. 6, according to some embodiments of the specification. The apparatus may be located on an execution body of the method in FIG. 6. The apparatus may include: an obtaining module 1001 configured to obtain a recognition result corresponding to a recognition process triggered by a client terminal, the identification process being performed for an offline object and a corresponding identification code thereof that are scanned by the client terminal, and the identification code including positioning assistance information of the offline object; and a transaction module 1002 configured to execute a transaction with respect to the offline object according to the recognition result.

FIG. 11 is a schematic structural diagram of another transaction execution apparatus applicable in a client terminal and corresponding to the method in FIG. 7, according to some embodiments of the specification. The apparatus may be located on an execution body of the method in FIG. 7. The apparatus may include: a scanning and recognition module 1101 configured to scan and recognize one or more identification codes, the one or more identification codes including positioning assistance information of one or more corresponding offline objects thereof; a determining module 1102 configured to determine a target offline object of a current user according to a recognition result; and a transaction module 1103 configured to execute a transaction with respect to the target offline object.

Based on the same ideas, embodiments of the specification further provide a transaction execution device applicable in a client terminal, including: at least one processor; and a memory communicatively connected to the at least one processor; where the memory stores instructions executable by the at least one processor, and the instructions, when executed by the at least one processor, cause the at least one processor to perform the operations including: scanning an offline object and a corresponding identification code thereof, the identification code including positioning assistance information of the offline object; triggering a recognition process for the offline object and the identification code that are scanned; and executing a transaction with respect to the offline object based on the recognition process.

Based on the same ideas, embodiments of the specification further provide a transaction execution device applicable in a server, including: at least one processor; and a memory communicatively connected to the at least one processor; where the memory stores instructions executable by the at least one processor, and the instructions, when executed by the at least one processor, cause the at least one processor to perform the operations including: obtaining a recognition result corresponding to a recognition process triggered by a client terminal, the recognition process being performed for an offline object and a corresponding identification code thereof that are scanned by the client terminal, and the identification code comprising positioning assistance information of the offline object; and executing a transaction with respect to the offline object according to the recognition result.

Based on the same ideas, embodiments of the specification further provide another transaction execution device applicable in a client terminal, including: at least one processor; and a memory communicatively connected to the at least one processor; where the memory stores instructions executable by the at least one processor, and the instructions, when executed by the at least one processor, cause the at least one processor to perform the operations including: scanning and recognizing one or more identification codes, the one or more identification codes including positioning assistance information of one or more corresponding offline objects thereof; determining a target offline object of a current user according to a recognition result; and executing a transaction with respect to the target offline object.

Based on the same ideas, embodiments of the specification further provide a non-transitory computer storage medium corresponding to the method in FIG. 2 and storing computer executable instructions. The computer executable instructions are set to: scanning an offline object and a corresponding identification code thereof, the identification code including positioning assistance information of the offline object; triggering a recognition process for the offline object and the identification code that are scanned; and executing a transaction with respect to the offline object based on the recognition process.

Based on the same ideas, embodiments of the specification further provide a non-transitory computer storage medium corresponding to the method in FIG. 6 and storing computer executable instructions. The computer executable instructions are set to: obtaining a recognition result corresponding to a recognition process triggered by a client terminal, the recognition process being performed for an offline object and a corresponding identification code thereof that are scanned by the client terminal, and the identification code comprising positioning assistance information of the offline object; and executing a transaction with respect to the offline object according to the recognition result.

Based on the same ideas, embodiments of the specification further provide a non-transitory computer storage medium corresponding to the method in FIG. 7 and storing computer executable instructions. The computer executable instructions are set to: scanning and recognizing one or more identification codes, the one or more identification codes including positioning assistance information of one or more corresponding offline objects thereof; determining a target offline object of a current user according to a recognition result; and executing a transaction with respect to the target offline object.

Embodiments of the specification are described above. Other embodiments fall within the scope of the appended claims. In some embodiments, the actions or steps in the claims may be performed in sequences different from those in the embodiments and expected results may still be achieved. In addition, the processes depicted in the accompanying drawings do not necessarily require specific sequences or consecutive sequences to achieve expected results. In some implementations, multitasking and parallel processing may be feasible or beneficial.

The embodiments of the specification are all described in a progressive manner. For same or similar parts in the embodiments, reference may be made among one another. Each embodiment focuses on difference from other embodiments. For example, an apparatus, a device, and a non-transitory computer storage medium embodiments are basically similar to method embodiments, and therefore are described briefly; for related parts, refer to the parts of the descriptions in the method embodiments.

The apparatus, the device, and the non-transitory computer storage medium provided in the embodiments of the specification correspond to the methods. Therefore, the apparatus, the device, and the non-transitory computer storage medium also have the beneficial technical effects similar to those of the corresponding methods. The beneficial technical effects of the methods have been described in detail above. Therefore, the beneficial technical effects of the corresponding apparatus, the device, and the non-transitory computer storage medium are not repeated herein.

In the 1990s, improvements of technologies can be clearly distinguished between hardware improvements (for example, improvements to a circuit structure such as a diode, a transistor, a switch, etc.) and software improvements (for example, improvements to a method process). However, with the development of technologies, improvements of many method processes can be deemed as direct improvements of hardware circuit structures. Designers almost all program an improved method process to a hardware circuit, to obtain a corresponding hardware circuit structure. Therefore, it does not mean that the improvement of a method process cannot be implemented by using a hardware module. For example, a programmable logic device (PLD) such as a field programmable gate array (FPGA) is a type of integrated circuit whose logic function is determined by a user by programming the device. The designers perform voluntary programming to "integrate" a digital system into a single PLD without requiring a chip manufacturer to design and prepare a dedicated integrated circuit chip. In addition, instead of making an integrated circuit chip manually, the programming is mostly implemented by using "logic compiler software", which is similar to the software compiler used to write programs. Original code before compiling is also written in a specific programming language, which is referred to as Hardware Description Language (HDL). There are many types of HDLs, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, Ruby Hardware Description Language (RHDL), etc. Currently, Very-High-Speed Integrated Circuit Hardware Description Language (VHDL) and Verilog are most commonly used. A person skilled in the art should also understand that as long as a method process is logically programmed and then programmed to an integrated circuit by using the foregoing hardware description languages, a hardware circuit that implements the logical method process can be easily obtained.

The controller can be implemented in any suitable manners, for example, the controller can take the form of, for example, a microprocessor or processor and a computer-readable medium storing computer-readable program code (for example, software or firmware) executable by the processor, a logic gate, a switch, an application-specific integrated circuit (ASIC), a programmable logic controller and an embedded microcontroller. Examples of the controller include, but are not limited to, the following microcontrollers: ARC 625D, Atmel AT91SAM, Microchip PIC18F26K20 and Silicone Labs C8051F320. The memory controller can also be implemented as part of the memory control logic. A person skilled in the art will also appreciate that, in addition to implementing the controller in the form of pure computer-readable program code, it is also possible to implement the controller in the form of a logic gate, switch, application-specific integrated circuit, programmable logic controller, and embedded microcontroller and other forms to achieve the same functions. Such a controller can thus be deemed as a hardware component and apparatus included therein for implementing various functions can also be deemed as structures inside the hardware component. Alternatively, apparatus configured to implement various functions can be deemed as both software modules implementing the method and structures inside the hardware component.

The system, the apparatus, the module, or the unit described in the foregoing embodiments can be implemented by a computer chip or body, or implemented by a product having some function. A typical implementation device may be a computing device. Examples of the computing device can include a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, when the apparatus is described, the apparatus is divided into units according to functions, which are described respectively. In some embodiments, in some embodiments of the specification, the functions of the units may be implemented in a same piece of or multiple pieces of software and/or hardware.

A person skilled in the art should understand that the embodiments of the specification may be provided as a method, a system, or a computer program product. Therefore, the embodiments of the specification may use a form of pure hardware embodiments, pure software embodiments, or embodiments with a combination of software and hardware. Moreover, the embodiments of the specification may use a form of a computer program product implemented on one or more computer-usable storage media (including, but not limited to, a disk memory, a CD-ROM, an optical memory, and the like) that include computer-usable program code.

The specification is described with reference to the flowcharts and/or block diagrams of the method, the device (system), and the computer program product according to the embodiments of the specification. It should be understood that computer program instructions may be used for implementing each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing some function in one or more processes in the flowcharts and/or in one or more blocks in the block diagrams.

These computer program instructions may further be stored in a computer readable memory that can instruct the computer or any other programmable data processing device to work in some manner, so that the instructions stored in the computer readable memory generate an artifact that includes an instruction apparatus. The instruction apparatus implements some functions in one or more processes in the flowcharts and/or in one or more blocks in the block diagrams.

These computer program instructions may further be loaded onto a computer or another programmable data processing device, so that a series of operations and steps are performed on the computer or other programmable devices, thereby causing computer-implemented processing. Therefore, the instructions executed on the computer or other programmable devices provide steps for implementing some functions in one or more processes in the flowcharts and/or in one or more blocks in the block diagrams.

In a typical configuration, the computing device includes one or more processors (CPUs), an input/output interface, a network interface, and a memory.

The memory may include, among computer readable media, a volatile memory such as a random access memory (RAM) and/or a non-volatile memory such as a read-only memory (ROM) or a flash memory (flash RAM). The memory is an example of the computer-readable medium.

The computer-readable medium includes non-volatile, volatile, portable, and non-portable media that may implement information storage by using any methods or technologies. Information may be computer-readable instructions, data structures, program modules, or other data. Examples of computer storage media include, but are not limited to, a phase change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette magnetic tape, tape and disk storage or other magnetic storage device or any other non-transmission media that may be configured to store information that a computing device can access. Based on the description in the specification, the computer-readable medium does not include transitory computer readable media (transitory media), such as a modulated data signal and a carrier.

It should also be noted that the terms "include," "comprise," and any other variants mean to cover the non-exclusive inclusion. Thereby, the process, method, article, or device which include a series of elements not only include those elements, but also include other elements which are not explicitly listed, or include the inherent elements of the process, method, article and device. Without further limitation, the element defined by a phrase "include one . . . " does not exclude other same elements in the process, method, article or device which include the element.

The specification can be described in the general context of computer-executable instructions executed by a computer, for example, program modules. In some embodiments, the program modules include a routine, a program, an object, a component, a data structure, and the like for executing a task or implementing an abstract data type. The specification may also be implemented in distributed computing environments in which tasks are performed by remote processing devices connected by using a communications network. In a distributed computing environment, the program modules may be located in both local and remote computer storage media including storage devices.

The embodiments of the specification are described in a progressive manner. For same or similar parts in the embodiments, reference may be made among one another. Each embodiment focuses on difference from other embodiments. For example, a system embodiment is basically similar to a method embodiment, and therefore is described briefly; for related parts, reference may be made to the parts of the descriptions in the method embodiment.

The foregoing descriptions are merely embodiments of the specification and are not intended to limit the application. For a person skilled in the art, various modifications and variations can be made to the application. Any modification, equivalent replacement, or improvement made without departing from the spirit and principle of the application shall fall within the scope of the claims of the application.

What is claimed is:

1. A transaction execution method, applicable in a client terminal connected to a server, comprising:
    scanning, by the client terminal, multiple offline objects in a vending machine and corresponding identification codes thereof in a scanning view frame, each identification code comprising positioning assistance information of the corresponding offline object;
    triggering, by the client terminal, a recognition process for the offline objects and the identification codes;
    determining, by the server, a target offline object of a current user according to a result of the recognition process by:
        determining whether an identification code is successfully recognized in a specified area of the scanning view frame, and
        responsive to determining the identification code is not successfully recognized in the specified area, determining the target offline object of the current user is within the specified area by: determining positions of multiple other offline objects in the scanning view frame according to corresponding recognized identification codes;
    obtaining, by the server, an association relationship between the current user and the target offline object, the association relationship being determined based on the result of the recognition process;
    executing, by the server, a transaction with respect to the target offline object of the current user according to the association relationship; and
    enabling the target offline object in the vending machine to be delivered to a pick-up port.

2. The method according to claim 1, wherein triggering the recognition process for the offline objects and the identification codes comprises, for each offline object:
    recognizing an image obtained through the scanning of the offline object, to obtain item information of the offline object; and
    performing feature extraction and analysis on the scanned identification code corresponding to the offline object, to recognize the positioning assistance information of the offline object.

3. The method according to claim 2, wherein recognizing the image obtained through scanning of the offline object, to obtain item information of the offline object comprises:
  performing feature extraction on the image obtained through the scanning of the offline object; and
  sending an extracted feature of the image to a server, for the server to recognize the item information of the offline object by performing feature comparison of the extracted feature of the image.

4. The method according to claim 2, wherein performing feature extraction and analysis on the scanned identification code, to recognize the positioning assistance information of the offline object comprises:
  recognizing the positioning assistance information of the offline object, and sending the positioning assistance information to the server.

5. The method according to claim 1, wherein the target offline object of the current user comprises at least one commodity displayed in the vending machine, the identification code is displayed in the vending machine, and the positioning assistance information comprises identification information of the vending machine; and
  executing the transaction with respect to the target offline object of the current user according to the association relationship comprises:
    paying for the at least one commodity using a payment account of the current user according to the association relationship; and
    enabling the at least one commodity in the vending machine to be delivered to the pick-up port.

6. The method according to claim 5, wherein paying for the at least one commodity using the payment account of the current user according to the association relationship comprises:
  determining a to-be-paid order generated by the server for the at least one commodity according to the association relationship; and
  paying for the to-be-paid order using the payment account of the current user.

7. A system comprising a server and a client terminal connected to a server, the client terminal and the server comprising one or more processors, and one or more non-transitory computer-readable memories coupled to the one or more processors and configured with instructions executable by the one or more processors to cause the system to perform operations comprising:
  scanning, by the client terminal, multiple offline objects in a vending machine and corresponding identification codes thereof in a scanning view frame, each identification code comprising positioning assistance information of the corresponding offline object;
  triggering, by the client terminal, a recognition process for the offline objects and the identification codes;
  determining, by the server, a target offline object of a current user according to a result of the recognition process by:
    determining whether an identification code is successfully recognized in a specified area of the scanning view frame, and
    responsive to determining the identification code is not successfully recognized in the specified area, determining the target offline object of the current user is within the specified area by: determining positions of multiple other offline objects in the scanning view frame according to corresponding recognized identification codes;
  obtaining, by the server, an association relationship between the current user and the target offline object, the association relationship being determined based on the result of the recognition process;
  executing, by the server, a transaction with respect to the target offline object of the current user according to the association relationship; and
  enabling the target offline object in the vending machine to be delivered to a pick-up port.

8. The system according to claim 7, wherein triggering the recognition process for the offline objects and the identification codes comprises, for each offline object:
  recognizing an image obtained through the scanning of the offline object, to obtain item information of the offline object; and
  performing feature extraction and analysis on the scanned identification code, to recognize the positioning assistance information of the offline object.

9. The system according to claim 8, wherein recognizing the image obtained through scanning of the offline object, to obtain item information of the offline object comprises:
  performing feature extraction on the image obtained through the scanning of the offline object; and
  sending an extracted feature of the image to a server, for the server to recognize the item information of the offline object by performing feature comparison of the extracted feature of the image.

10. The system according to claim 8, wherein performing feature extraction and analysis on the scanned identification code, to recognize the positioning assistance information of the offline object comprises:
  recognizing the positioning assistance information of the offline object, and sending the positioning assistance information to the server.

11. The system according to claim 7, wherein the target offline object of the current user comprises at least one commodity displayed in the vending machine, the identification code is displayed in the vending machine, and the positioning assistance information comprises identification information of the vending machine; and
  the executing a transaction with respect to the target offline object of the current user according to the association relationship comprises:
    paying for the at least one commodity using a payment account of the current user according to the association relationship; and
    enabling the at least one commodity in the vending machine to be delivered to the pick-up port.

12. The system according to claim 11, wherein paying for the at least one commodity using the payment account of the current user according to the association relationship comprises:
  determining a to-be-paid order generated by the server for the at least one commodity according to the association relationship; and
  paying for the to-be-paid order using the payment account of the current user.

13. One or more non-transitory computer-readable memories coupled to one or more processors and configured with instructions executable by the one or more processors to cause a server and client terminal connected to the server to perform operations comprising:
  scanning, by the client terminal, multiple offline objects in a vending machine and corresponding identification codes thereof in a scanning view frame, each identification code comprising positioning assistance information of the corresponding offline object;

triggering, by the client terminal, a recognition process for the offline objects and the identification codes;
determining, by the server, a target offline object of a current user according to a result of the recognition process by:
   determining whether an identification code is successfully recognized in a specified area of the scanning view frame, and
   responsive to determining the identification code is not successfully recognized in the specified area, determining the target offline object of the current user is within the specified area by: determining positions of multiple other offline objects in the scanning view frame according to corresponding recognized identification codes;
obtaining, by the server, an association relationship between the current user and the target offline object, the association relationship being determined based on the result of the recognition process;
executing, by the server, a transaction with respect to the target offline object of the current user according to the association relationship; and
enabling the target offline object in the vending machine to be delivered to a pick-up port.

14. The one or more non-transitory computer-readable memories according to claim 13, wherein triggering the recognition process for the offline objects and the identification codes comprises, for each offline object:
   recognizing an image obtained through the scanning of the offline object, to obtain item information of the offline object; and
   performing feature extraction and analysis on the scanned identification code, to recognize the positioning assistance information of the offline object.

15. The one or more non-transitory computer-readable memories according to claim 14, wherein recognizing the image obtained through scanning of the offline object, to obtain item information of the offline object comprises:
   performing feature extraction on the image obtained through the scanning of the offline object; and
   sending an extracted feature of the image to a server, for the server to recognize the item information of the offline object by performing feature comparison of the extracted feature of the image.

16. The one or more non-transitory computer-readable memories according to claim 14, wherein performing feature extraction and analysis on the scanned identification code, to recognize the positioning assistance information of the offline object comprises:
   recognizing the positioning assistance information of the offline object, and sending the positioning assistance information to the server.

17. The one or more non-transitory computer-readable memories according to claim 13, wherein the target offline object of the current user comprises at least one commodity displayed in the vending machine, the identification code is displayed in the vending machine, and the positioning assistance information comprises identification information of the vending machine; and
   the executing a transaction with respect to the target offline object of the current user according to the association relationship comprises:
   paying for the at least one commodity using a payment account of the current user according to the association relationship; and
   enabling the at least one commodity in the vending machine to be delivered to the pick-up port.

18. The one or more non-transitory computer-readable memories according to claim 17, wherein paying for the at least one commodity using the payment account of the current user according to the association relationship comprises:
   determining a to-be-paid order generated by the server for the at least one commodity according to the association relationship; and
   paying for the to-be-paid order using the payment account of the current user.

\* \* \* \* \*